United States Patent [19]
Saunders et al.

[11] 4,061,901
[45] Dec. 6, 1977

[54] TELEMETERING SYSTEM

[75] Inventors: Jim G. Saunders, Mission Viejo, Calif.; Alfred B. Stucki, Brigham City, Utah

[73] Assignee: Thiokol Corporation, Newtown, Pa.

[21] Appl. No.: 715,736

[22] Filed: Aug. 19, 1976

[51] Int. Cl.$^2$ .................. G06M 3/14; G01F 23/10
[52] U.S. Cl. ..................... 235/92 EV; 235/92 FL; 235/92 R; 73/321; 73/313
[58] Field of Search ........ 235/92 EV, 92 MP, 92 FL, 235/92 MT, 92 R; 340/244 A, 271; 335/206; 73/313, 321

[56] References Cited

U.S. PATENT DOCUMENTS

| | | | |
|---|---|---|---|
| 3,087,030 | 4/1963 | Shebanow | 335/206 |
| 3,145,292 | 8/1964 | Schwaninger | 235/92 EV |
| 3,182,457 | 5/1965 | Sato et al. | 235/92 FL |
| 3,258,554 | 6/1966 | Cloup | 335/206 X |
| 3,459,042 | 8/1969 | Brown | 73/321 X |
| 3,586,836 | 6/1971 | Paul | 235/92 EV |
| 3,594,669 | 7/1971 | Yamane et al. | 335/207 |
| 3,969,941 | 7/1976 | Rapp | 73/321 |

*Primary Examiner*—Daniel M. Yasich
*Attorney, Agent, or Firm*—Stanley A. Marcus; Edward E. McCullough

[57] ABSTRACT

A small, permanent magnet is eccentrically supported on a shaft that is rotated by some means, such as gears, in response to linear change in some quantity, e.g. accumulated water from rainfall. A float on the surface of the water in a receptacle transmits the motion to the gears. At least three sensors, responsive to magnetic flux, are mounted in a circle concentric about the shaft so that the rotating magnet will produce a response as it passes each sensor. Each sensor is connected to an input terminal of two of a plurality of flip-flops (one for each sensor), so that the resultant stored bit of information in each flip-flop is determined by two different sensors. This stored bit comprises a digit of a three digit binary code that is changed whenever a sensor responds. It is available at the output terminal of each flip-flop, which is connected to an AND-OR inverter containing at least three two-input AND gates and an OR gate. Each flip-flop output is connected to one input terminal of two different AND gates, so that the output of each AND gate is determined by the stored bit of two different flip-flops. Each AND gate simplifies the three-digit, binary code that is supplied to the OR gate, to which outputs of the AND gates are connected. The sequence of response of the sensors (or direction of shaft rotation) is determined according to the combination of signals received from the AND gates. The OR gate, which is connected to a counting and memory device, produces a positive or negative signal that causes the counting device to count positively or negatively. At the same time, the signal pulse from the AND-OR inverter is fed to the counting device via clock means, and, optionally, wave-shaping means. This counting and memory device is in turn connected to radio means that automatically transmits any signal that represents an informational change in the previous broadcast.

9 Claims, 3 Drawing Figures

TELEMETERING SYSTEM

BACKGROUND OF THE INVENTION

This invention relates broadly to automatic telemetry systems. More specifically, it relates to such a system wherein linear movement in quantities to be measured is converted to rotary motion of a magnet, passage of which may be sensed, counted, recorded, and transmitted to a central receiving unit.

Prior art devices for remotely measuring and transmitting variable quantities, such as rainfall, water level of rivers, or water equivalents of snow tended to be mechanically complex with many moving parts, expensive, and somewhat unreliable.

SUMMARY OF THE INVENTION

Objects of the present invention, which overcomes to a large extent these difficulties of the prior art, are: (1) To provide apparatus for automatically measuring, recording, and transmitting data pertaining to changes in water level, such as occurs in rainfall, in rivers, or in the process of obtaining water equivalents of snowfall; and (2) to provide such an apparatus that is less expensive and more reliable than prior art devices.

In the present invention, a vertical tube is arranged to receive water, the level of which is to be measured, e.g., from a rain collection receptacle. A float, balanced by a counterweight, rests on the surface of the water to be measured. A perforated, steel tape connects the float to the counterweight and is supported on a sprocket whose teeth engage the perforations in the tape. Hence, any vertical movement of the float on the water causes the sprocket to rotate. This rotary motion is transmitted to a shaft via some means such as an augmenting gear train that rotates the shaft many times for one rotation of the sprocket.

A magnet, eccentrically mounted to the shaft, produces successive responses in at least three magnetic sensors that are equally spaced apart, equidistant from the shaft, and adjacent the circle described by the rotating magnet. Each sensor is connected to an input of two different flip-flop circuits, so that the data bit stored in each flip-flop is determined by two sensors — the number of flip-flops being the same as the number of sensors. Each data bit stored in a flip-flop constitutes a digit of a three-digit, binary code. The output of each flip-flop is connected to an input of two different AND gates of an AND-OR inverter that contains the same number of AND gates as the number of sensors. The output of each AND gate contributes a data bit or digit to a simplified binary code that is then entered into the OR gate, where it is converted to a positive or negative signal.

The output of the OR gate is connected to an up-down counter and determines whether the counter counts positively or negatively. Simultaneously, the signals produced by the sensors are entered into the up-down counter via the AND-OR inverter and are counted and stored therein. The changed data may then be transmitted by radio, recorded, etc.

DESCRIPTION OF THE PREFERRED EMBODIMENTS

The present invention has a number of applications, since it is capable of automatically measuring the rise and fall of any material such as liquid. Hence, it is useful in monitoring the water level of rivers, the quantity of rainfall, and water equivalent of snow. The last of these measurements is accomplished by allowing the snow to accumulate on a flat bladder filled with a liquid antifreeze. Weight of the snow causes the liquid to rise in a vertical tube to which the bladder is connected. The resulting liquid level can then be measured according to the present invention.

Figure 1:
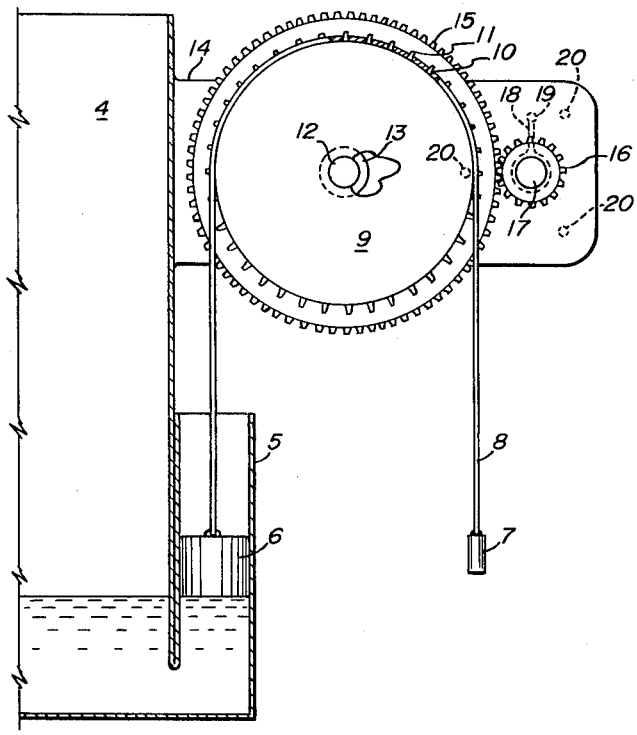
FIG. 1 is a side elevation, partially shown in section, of the mechanical portion of the invention.

In the preferred embodiment of the invention shown in FIG. 1, a cylindrical water receptacle 4 communicates with a vertical tube 5, so that any water in the receptacle 4 will also fill the tube 5 to the same level. The receptacle 4 may receive water from some other device, it may be used to catch rain directly, or it may contain a bladder or liquid antifreeze for measuring water equivalent of snow. A float 6 in the tube 5 is attached to a counterweight 7 via some connector 8, that is supported on a rotatable support 9. In this embodiment of the invention, the rotatable support 9 is a sprocket and the connector 8 is a temperature-compensated, perforated, steel tape, the perforations 10 of which are arranged to engage the teeth 11 of the sprocket 9.

The sprocket 9 rotates on a central shaft that is mounted on a bearing 13 supported by a bracket 14 that is fixed to the receptacle 4. A large diameter, spur gear 15 is also fixed to the shaft 12 so that it is rotated thereby when the float 6 is moved as water level in the tube 5 rises or falls. A small diameter spur gear 16, supported on a shaft 17 that fits in a bearing on the bracket 14, meshes with the large gear 15. The difference in sizes of the gears 15 and 16 is such that the smaller gear is rotated many times for one rotation of the larger gear. A number of other devices could be used in place of the augmenting gear train described, such as belts and pulleys.

An arm 18 holding a magnet 19 is also attached to the shaft 17, to be rotated by the small gear 16. A plurality of sensors 20, electrically responsive to magnetic fields, are fixed to the bracket 14 surrounding the circle described by the rotating magnet closely enough to respond to proximity of the magnet 19, and are equally spaced apart. In this preferred embodiment, the sensors 20 are magnetic reed switches that are closed by proximity of the magnet 19. However, other devices, such as magnetic pickups or induction coils may also be used.

Figure 2:
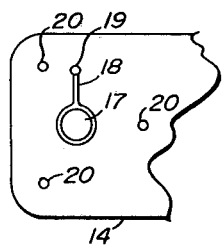
FIG. 2 is a reversed view of the bracket shown in FIG. 1.

As shown in FIG. 2, each of the switches 20 is connected to the "S" input terminal of one flip-flop 21 and to the "R" input terminal of another of a plurality of flip-flops equal in number to the switches 20. In this embodiment, three switches 20 and three flip-flops 21 are used; and the stored data bit available at the "Q" output terminal of each flip-flop 21 is determined by two consecutive switches 20 (A, B, or C). Although the set-reset type of flip-flop circuit is preferred, other types may be used. Altogether, the X, Y, and Z outputs of the flip-flops 21 constitute a three-digit, binary code that can be used to indicate the direction in which the magnet 19 is rotating.

Figure 3:
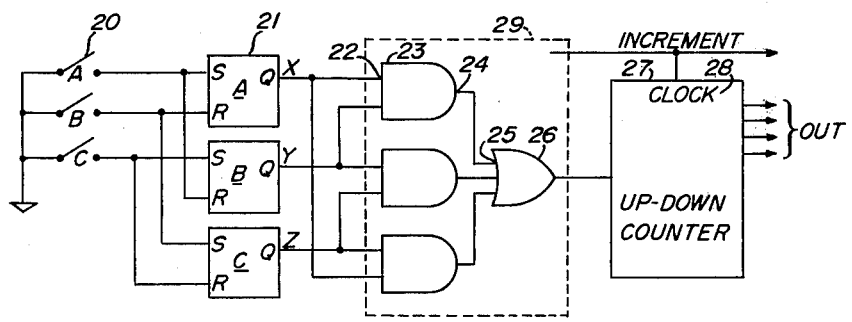
FIG. 3 is a block diagram of the electrical circuit portion of the invention.

Each output Q(X, Y, or Z) of the flip-flops 21 is connected to an input terminal 22 of two consecutive AND gates 23, of a total of three of such gates. The output terminal 24 of each AND gate is connected to one of three input terminals 25 of an OR gate 26. The nature of each data bit (whether it is "0" or "1") supplied to the OR gate by each output 24 of an AND gate is determined by the combination of Q flip-flop output signals that each AND gate is receiving at that instant. In passing through the AND gates, a "1" is eliminated from each three-digit code. Hence, the nature of the three-digit, binary code supplied to the OR gate by the AND gates can indicate the direction of rotation of the magnet 19 about the shaft 17. For example, three "0's" indicate counterclockwise rotation, while the presence of a "1" in the code indicates a clockwise rotation. The OR gate then transfers from its output terminal a positive or negative signal, as determined by the binary code, to the input of an up-down counter 27. The increment or clock input 28 of the up-down counter receives a voltage from an increment line operated by the sensors (FIG. 3). The counter 27 counts and records the pulses received as positive or negative numbers, indicating the amount of rise or fall of the water level in the tube 5. The AND and OR gates are contained in an AND-OR inverter 29.

The information stored in the counter 27 may then be dispensed or recorded by any of a variety of means. In one application it is automatically transmitted via radio whenever a change in the information occurs. This has been found to be useful in connection with remote devices for measuring rainfall or the rise and fall of water levels in rivers.

OPERATION

Assuming that a closed switch indicates a digital "1" and an open switch indicates a "0," then the following description with reference to Tables I and II, will show how the digital, binary code can indicate clockwise or counterclockwise rotation of the shaft 12.

TABLE 1

| Clockwise Rotation | | Counterclockwise Rotation | |
|---|---|---|---|
| Switch | XYZ | Switch | XYZ |
| A | 01– | A | 01– |
| B | 110 | C | 001 |
| C | 101 | B | 100 |
| A | 011 | A | 010 |
| B | 110 | C | 001 |
| C | 101 | B | 100 |

TABLE II

| S R | Q |
|---|---|
| 01 | 1 |
| 10 | 0 |
| 11 | No Change |

If the shaft 17 begins its rotation by closing switch A, the input S of flip-flop A is "1" and input R is "0." Reference to Table II, which shows the output information for the R and S inputs of any given flip-flop 21, indicates that the output X would be "0." This is shown in Table I, which lists the data outputs X, Y, and Z for the closure of each switch. At the same time, flip-flop B has a "0" input at S and a "1" input at R. Reference to Table II shows that the Y output is "1." This is also shown in Table I. Since, at this time, the inputs of flip-flop C have been unaffected by the closure of a switch, there is no information at output Z. Hence, the three digit code produced by the first closure of switch A, as recorded in Table 1, is "01–" (a blank is provided for the missing third digit).

By the same process, it can be seen in Table II that when switch B is closed, the outputs X, Y, and Z are "1," "1," and "0," respectively. Hence, whenever a switch 20 is closed, the outputs X, Y, and Z produce a three-digit, binary code stored in the three flip-flops A, B, and C.

Since these flip-flops 21 are connected to the switches 20 in a nonuniform manner, and connected so that the outputs of two flip-flops 21 are changed every time a switch 20 is closed while the third remains unchanged, the binary code produced when the shaft 17 rotates in a clockwise direction differs from that produced when the rotation is counterclockwise. Table I shows that each code produced by clockwise rotation of the shaft 17 has two "1's" and one "0," while that of the counterclockwise rotation has two "0's" and one "1."

By a similar process, a "1" is eliminated from the binary code by the AND gates, so that each code produced by clockwise rotation of the shaft 17 contains one "1," while counterclockwise rotation thereof contains all "0's." This simplifies the input to the OR gate, so that a relatively positive or negative signal can be produced at the output thereof.

An invention has been described that constitutes a valuable advance over the prior art. Although the preferred embodiment has been described specifically with regard to detail, it should be noted that many such details may be altered without departing from the scope of the invention, as it is defined in the following claims.

The invention claimed is:

1. A system for automatically preparing digital data to describe changing liquid levels, comprising:
    shaft means;
    a support for the shaft means;
    means coacting for rotating the shaft means in response to linear motion of the changing liquid level;
    a magnet fixed eccentrically for rotation relativve to the shaft means;
    three sensors (A, B, and C) capable of switching an electric circuit in response to magnetic flux from said magnet;
    said support including means for supporting the sensors relative to the shaft means, so that they are positioned equidistantly from the shaft means and sufficiently close thereto to respond to proximity of the magnet as it is rotated by the shaft means;
    three flip-flops, each having an R input, an S input, and an output, the R input of each flip-flop being connected to one of the sensors and the S input being connected to one different sensor, so that, when one of the sensors switches the circuit, the inputs of two flip-flops are changed and, hence, the outputs of two flip-flops are changed, but the output of a third flip-flop remains unchanged, whereby the outputs of the three flip-flops can provide a three digit, binary code capable of distinguishing clockwise and counterclockwise rotation of the shaft means, since one digit of each code is determined by the previous switch;
    three AND gates, each having two inputs and one output, each input being connected to two adjacent flip-flop outputs, as arranged in circular sequence;
    an OR gate having three inputs and an output, each input connected to an output of a different one of the AND gates; and an up-down counter connected at its up-down input to the output of the OR gate and operatively at its increment input to the sensors.

2. The telemetering system of claim 1 wherein the means, responsive to linear motion, for rotating the shaft means, comprises:
   a float to be supported on fluid to be measured;
   a counterweight;
   a flexible, nonstretchable connector attached at one end to the float and at its other end to the counterweight;
   a rotatable support for the connector that is rotated by any longitudinal movement of the connector thereon; and
   means for transmitting rotation of the rotatable support to the shaft means.

3. The telemetering system of claim 2 wherein the rotatable support is a sprocket and the flexible connector is a temperature-compensated, steel tape having perforations that engage the teeth of the sprocket.

4. The telemetering system of claim 2 wherein the means for transmitting rotation of the rotatable support to the shaft means is a gear train of increasing rotations per rotation of the rotatable support.

5. The telemetering system of claim 1 wherein the flip-flop means is a "set-reset" flip-flop for each of the sensors.

6. The telemetering system of claim 1 wherein the sensors are magnetic reed switches.

7. The telemetering system of claim 1 wherein the means for combining the output of the flip-flops to produce a simplified, digital, binary code is a plurality of AND gates.

8. The telemetering system of claim 1 wherein the means for converting the simplified, digital, binary code to positive and negative signals is an OR gate.

9. An automatic, system for measuring changes in water levels and for preparing the resulting data in digital form, comprising:
   a receptacle for water;
   a vertical tube communicating with the receptacle, so that it contains the same water level as the receptacle;
   a float in the tube, to be supported on water therein;
   a counterweight to balance the float;
   a perforated, nonstretchable tape connecting the float to the counterweight;
   a sprocket having teeth that mesh with the tape perforations, so that longitudinal movement of the tape rotates the sprocket;
   a support for the sprocket, spaced relative to the tube;
   a shaft held by the support;
   means for transmitting rotational motion of the sprocket to the shaft;
   a magnet mounted eccentrically on the shaft;
   three magnetic reed switches equally spaced apart and equidistant from the shaft, but near enough to the circle described by the rotating magnet to be closed by proximity of the magnet;
   three flip-flops, each having an R input, and S input, and an output, the R input of each flip-flop being connected to one of the sensors and the S input being connected to one different sensor, so that, when one of the sensors switches the circuit, the inputs of two flip-flops are changed and, hence, the outputs of two flip-flops are changed, but the output of a third flip-flop remains unchanged, whereby the outputs of the three flip-flops can provide a three digit, binary code capable of distinguishing clockwise and counterclockwise rotation of the shaft means, since one digit of each code is determined by the previous switch;
   three AND gates, each having two inputs and one output, each input being connected to two adjacent flip-flop outputs, as arranged in circular sequence;
   an OR gate having three inputs and an output, each input connected to an output of a different one of the AND gates; and
   an up-down counter connected at its up-down input to the output of the OR gate and operatively connected at its increment input to the sensors.

* * * * *